(12) United States Patent
Kaneko

(10) Patent No.: US 6,749,647 B2
(45) Date of Patent: Jun. 15, 2004

(54) FIBER DYEING METHOD AND DYED FIBER PRODUCTS

(75) Inventor: Takashi Kaneko, Hanyuu (JP)

(73) Assignee: Kanemasu Corporation, Saitama-ken (JP)

(*) Notice: Subject to any disclaimer, the term of this patent is extended or adjusted under 35 U.S.C. 154(b) by 9 days.

(21) Appl. No.: 10/132,227

(22) Filed: Apr. 26, 2002

(65) Prior Publication Data

US 2002/0166183 A1 Nov. 14, 2002

(30) Foreign Application Priority Data

May 11, 2001 (JP) ........................ 2001-142326

(51) Int. Cl.⁷ .................... C09B 61/00; D06P 1/34
(52) U.S. Cl. ................. 8/637.1; 8/438; 8/646
(58) Field of Search .................. 8/646, 438, 637.1

(56) References Cited

U.S. PATENT DOCUMENTS 1,263,126 A * 4/1918 Saxe
1,399,014 A * 12/1921 Hart
5,221,289 A * 6/1993 Miyamatsu et al.

FOREIGN PATENT DOCUMENTS

JP 2-191780 * 7/1990
JP 2-234987 * 9/1990

OTHER PUBLICATIONS

Derwent Abstract of JP–02191780 A, Jul. 27, 1990.*
Leechman, Vegetable Dyes from North American Plants, 1945, The Webb Publishing Company, pp. 28–31.*
Kierstead, Natural Dyes, 1950, Bruce Humphries, Inc., pp. 17,18.*

* cited by examiner

Primary Examiner—Margaret Einsmann
(74) Attorney, Agent, or Firm—Mattingly, Stanger & Malur, P.C.

(57) ABSTRACT

A fiber is dyed with fine powder of peels of citrus fruits, the fine powder being obtained by pulverizing dried peels of the citrus fruits. The dyeing is performed using a bath of a dye extracted from the fine powder of the peels of the citrus fruits, or performed at the same time as extracting the dye. The fine powder of the peels of the citrus fruits used in the dyeing is powder having passed a sieve of 140 to 50 mesh.

4 Claims, No Drawings

FIBER DYEING METHOD AND DYED FIBER PRODUCTS

BACKGROUND OF THE INVENTION

1. Field of the Invention

The present invention relates to a fiber dyeing method and a dyed fiber product using citrus fruits.

2. Description of the Related Art

Hitherto, it has been widely known to employ dyes extracted from natural plants for dyeing fiber products, such as threads and cloths.

A typical example of such dyeing methods is called dyeing with vegetable dyes, in which a decoction of roots, stems, barks, leaves, flowers, seeds, etc. of various natural plants is made and used as a dye bath.

For example, fibers (fiber products) are dyed purple by mordanting using an extract solution decocted from roots of gromwells. Also, fibers are dyed red by mordanting using a bath of a dye extracted from roots of madders with hot water, or by direct dyeing using a bath of a dye extracted from petals of safflowers. Further, fibers are dyed deep (indigo) blue by reduction dyeing using fermented leaves of Japanese indigo plants (called Sukumo in Japanese).

For dyeing fibers yellow, such plants as an Amur cork, gardenia, turmeric, *Miscanthus tinctorius* Hackel (called Kariyasu in Japanese), myrica, saffron, *Arthraxon hispidus* Makino (called Kobunagusa in Japanese), and *Garcinia subelliptica* Merr. (called Fukugi in Japanese) are used. An Amur cork is a deciduous tall tree, and a solution extracted from fresh-yellow parts inside barks of Amur corks is employed for dyeing. A pigment component of an Amur cork is called berberine that is only one basic dye among natural dyes. A gardenia is employed in direct dyeing using a bath of a dye extracted from seeds with hot water.

Fibers dyed using natural plant dyes are excellent products having delicate, deep and tasteful color tones. However, because the number of kinds natural plant dyes is small and dyeing methods are delicate and complex as described above, it is difficult to always obtain a desired hue with stability.

SUMMARY OF THE INVENTION

Dyeing with natural plant dyes gives thin colors in many cases and has a difficulty in achieving fast dyed colors even with repetition of the dyeing. Also, since the dyeing time is very long and the dye bath is not homogeneous and has unstable quality in many cases, it is not easy to realize a process for obtaining a stable dye bath.

In particular, when endeavoring to dye fibers in a mandarin or orange color, i.e., in a typical yellow color, by a conventional method using citrus fruits such as mandarin oranges or bitter oranges, it has been impossible to reproduce a fresh and bright color specific to the citrus fruits.

With the view of overcoming the problems set forth above, it is an object of the present invention to provide a dyeing method and a dyed fiber product which can achieve dyeing in a fresh and bright color tone specific to citrus fruits in vivid fashion with good mass productivity.

According to a first aspect, the present invention provides a fiber dyeing method including a step of dyeing a fiber with fine powder of peels of citrus fruits, the fine powder being obtained by pulverizing dried peels of the citrus fruits. According to a second aspect, the present invention provides a dyed fiber product that is dyed using fine powder of dried peels of citrus fruits.

Further, the present invention provides a fiber dyeing method wherein the dyeing step is performed using a bath of a dye extracted from the fine powder of the peels of the citrus fruits, or performed at the same time as extracting the dye. In the fiber dyeing method, preferably, the fine powder of the peels of the citrus fruits is powder having passed a sieve of 140 to 50 mesh.

DESCRIPTION OF THE PREFERRED EMBODIMENTS

Citrus fruits used as raw materials for dyeing in the present invention mean a general term of fruits belonging to Rutaceae and include, e.g., mandarin oranges, bitter oranges, pomelos, kumquats, citrons, and lemons. More concretely, preferable examples of plants belonging to Rutaceae are *Citrus unshu* (mandarin oranges produced in south districts in Japan), *Citrus kishu* (mandarin oranges produced in Kii districts in Japan), *Citrus naruto* (mandarin oranges produced in Naruto districts in Japan), family species of those oranges, a summer orange, a bitter orange, a hassaku orange, a ponkan orange, *Citrus sulcate*, a navel orange, an orange, a pomelo, a shaddock, a grapefruit, a kumquat, a citron, *Citrus sudachi*, and a lemon. Especially preferable raw materials are mandarin oranges such as *Citrus unshu*, and bitter oranges such as a summer orange and a bitter orange.

In the present invention, dried peels of those citrus fruits are pulverized to produce fine powder of the peels of the citrus fruits, and dyeing is performed using the fine powder as a dye. Peels are obtained by removing sarcocarp (flesh) from citrus fruits and are then subjected to a pulverizing step after being sufficiently dried. The peels may be dried by natural drying or artificial drying, e.g., hot-air drying. Anyway, it is preferably that the peels are sufficiently dried to become as hard as possible. In other words, the water content is preferably not more than 30 weight %, more preferably in the range of 15 to 25 weight %, from the viewpoints of obtaining the fine powder with high dyeing efficiency, ensuring improved preservation, and providing dyes that can be used in a mixed precipitation method.

Peels of citrus fruits contain hesperidin that is one of flavonoids, i.e., yellow pigment compounds, and the hesperidin is used as a yellow dye. However, the function of hesperidin as a pigment is so weak that the hesperidin cannot be directly used as a dye unless intensified. This is one of the reasons why peels of citrus fruits have not been popularly employed in dyeing with vegetable dyes in the past. Particularly, cottons and flaxes are difficult to dye because they are made of cellulose fibers having no reactive groups such as reactive carboxyl and amino groups. Dyeing with vegetable dyes represents a history of dyeing of silk fibers made of protein having those reactive groups, and has a difficulty in application to cottons in most cases. In particular, the dyeing power of hesperidin for cottons is insufficient and it has been difficult to dye cottons using hesperidin with satisfactory clearness up to now.

In the present invention, since peels of citrus fruits are dried and pulverized into fine powder, the effect of extracting a dye in a dye extracting step is very great and develops a very high dyeing power. Also, a sufficient degree of dyeing power can be developed even in the case of using a method in which dyeing is performed while extracting a dye without executing the dye extracting step separately.

The fine powder of the peels preferably has particle sizes corresponding to the sieve standards of 140 to 50 mesh. In particular, after the pulverization, the fine powder is preferably passed through a sieve so that the particle size of the powder is even. A sieve mesh is preferably in the range of 140 mesh (corresponding to a particle size of 0.104 mm) to 50 mesh (0.295 mm). More preferably, the fine powder having passed the sieve has particle sizes in the range of 120 mesh (0.124 mm) to 80 mesh (0.175 mm).

A method for pulverizing the dried peels is not limited to a particular one, but dry pulverization is preferable. The dry pulverization is performed using, e.g., a high-speed rotating pulverizer, a ball mill, a churning mill, or a jet pulverizer. The dried peels of citrus fruits are pulverized into fine powder through dry pulverization. An apparatus particularly suitable for obtaining such fine powder is a pulverizer of the type that it comprises an upper mill and a lower mill, and the dried peels are supplied to between the upper and lower mills and pulverized while both the mills are rotated in opposed directions relative to each other and preferably the lower mill is vertically moved. That type of pulverizer is able to produce the fine powder being even in particle size based on the principle of the so-called stone mill, and to easily provide the fine powder having particle sizes in the above-mentioned preferable mesh range. One example of commercially available pulverizers of that type is "Micropowder G-007" manufactured by Nishi Tekkojo Inc. (Japan).

Dyeing can be performed by a method of immersing fibers (fiber products) in a bath of a dye extracted from the fine powder of peels of citrus fruits, or a method of carrying out a dye extracting step and a dyeing step at the same time. The dye bath is prepared by putting the fine powder of peels of citrus fruits in water and boiling down it for about 20 minutes so that a decoction is obtained. Such a decocting step under boiling-down may be repeated several times. On that occasion, lye diluted with water or an aqueous solution containing calcium carbonate at a concentration of about 5 grams/10 liters may be used. The dye bath thus prepared is heated and fibers are immersed in the heated dye bath for about 10 minutes for dyeing under boiling. Alternatively, in the step of preparing the dye bath, fibers may be concurrently immersed in the dye bath for simultaneous dyeing. The temperature of the dye bath in the dyeing step may be the normal temperature, but it is preferably set to the range of about 40 to 80° C. The reason is that if the temperature is low, the dyeing time would be too long, and if the temperature exceeds 80° C., the dyeing operation would be hard to perform and a pleasant smell of citrus fruits would hardly remain as described later. After the dyeing under boiling, fibers in the form of fiber products, such as threads or cloths, are left to stand in a static condition until being cooled down. Finally, the dyed fibers are subjected to washing with water and then drying, whereby the dyeing process is completed. After the dyeing under boiling, the fibers may be treated with a mordant for color fixing as the occasion requires. The mordant can be, e.g., an aqueous mordant solution containing several percentages of aluminum, tin, chromium, acid, copper, and iron compounds, and the mordanting is usually performed for about 30 minutes. After the mordanting, the fibers are washed with water. If necessary, the fibers may be immersed again in the heated dye bath for the dyeing under boiling. Even when the fibers are not treated with a mordant, the dyed color is satisfactorily fixed and has high fastness.

The kind of fibers to be dyed may be either natural or synthetic. However, preferable fiber examples are cellulose fibers such as cottons, silk fibers, wool fibers, and polyamide fibers. Above all, cotton fibers or other fibers mixed with cottons are particularly preferable. Fibers can be handled in various forms of fiber products such as threads, fabrics, knitted goods, non-fabrics, plain cloths, and sewed products.

The dyed fiber products thus obtained according to the present invention are dyed in a fresh yellow color specific to natural citrus fruits, have an antibacterial effect, and retains a smell of the natural citrus fruits that sustains for a long time. Accordingly, the dyed fiber products are suitably used as articles of clothing that have tasteful natures different from those of conventional ones and hence have a highly practical value.

Further, when fibers are dyed by preparing a bath of a dye that is extracted from citrus fruits according to the conventional dyeing method with vegetable dyes, a saccharide contained in the citrus fruits together with the dye is lost, and therefore the intrinsic specific color of the citrus fruits cannot be developed unless another aid is added prior to the start of the dyeing step. In contrast, according to the fiber dyeing method of the present invention, since peels of citrus fruits are dried as they are, a saccharide remains in fine power obtained by pulverizing the peels of citrus fruits, and hence an extra step of adding an aid is no longer required. Moreover, a color component tends to easily separate, and a color development rate is increased so that coupling with a mordant occurs in a more rational manner based on ion adsorption. Consequently, color fixing on the dyed fiber products due to adsorption is accelerated with the additive process. Thus, the dyeing method of the present invention is also superior in mass productivity.

A practical example of the present invention will be described below.

About 100 g of dried peels (with the water content of about 20 weight %) was prepared by drying peels of *Citrus unshu*, and put into the above-mentioned pulverizer "Micropowder G-107" (manufactured by Nishi Tekkojo Inc.) having rotating upper and lower mills. The pulverizer was operated to pulverize the dried peels for 5 minutes, whereby a white fine powdery material was obtained as fine powder of mandarin peels. The fine powder was passed through a 100-mesh filter (sieve) to obtain fine power that is even in particle size.

Then, 100 g of the fine powder was put into 500 ml of water and boiled down for 20 minutes, whereby a dye bath was obtained through decoction under boiling. The dye bath was cooled and a piece of cotton cloth was immersed in the dye bath for 10 minutes while holding the bath temperature at 70° C. Subsequently, the dyed cloth was obtained by washing the cotton cloth with water and drying it.

As seen from the following results of measuring the fastness of color of the dyed cloth, superior fastness was obtained. In particular, the color fastness against most kinds of cleaning showed a maximum rank of grade 5 as given below.

Fastness against light (JIS L0842 light emitted from a carbon arc lamp): grade 3

Fastness against washing (JIS L0844): color change and fading; grade 4–5, contamination; grade 4–5

Fastness against sweat (JIS L0848): all of color change and fading and contamination against acidic and alkaline sweat; grade 4–5

Fastness against friction (JIS L0849): dry; grade 5, wet; grade 4–5

Fastness against dry cleaning (JIS L0860): color change and fading; grade 5, contamination; grade 5

Fastness against water (JIS L0860): color change and fading; grade 5, contamination; grade 4–5

Also, an antibacterial test was conducted by using yellow *staphylococcus aureus* ATCC6538P and comparing the number of live bacteria in the dyed fiber product between before the washing and after repeating the washing ten times according to JIS L0217. The test result showed a sufficient degree of bacteriostatic activity. Further, even after measuring the fastness against light, it was confirmed that the dyed fiber product had a smell specific to *Citrus unshu*.

According to the present invention, as described above, in dyeing with citrus fruits which has not yet succeeded in achieving a satisfactory dyed color until now, a bright and fresh color tone specific to citrus fruits can be clearly reproduced with ease, and high mass productivity can be ensured. Further, it is possible to provide, to fiber products dyed according to the present invention, not only a sufficient degree of dyed color fastness and a smell specific to citrus fruits, but also the antibacterial effect and the deodorizing effect. As a result, dyed fiber products having a highly practical value and suitably used as novel articles of clothing can be obtained.

What is claimed is:

1. A fiber dyeing method including steps of:

pulverizing dried peels of citrus fruits;

obtaining fine powder of peels of the citrus fruits by passing the pulverized peels of the citrus fruits through a sieve of 140 to 50 mesh;

putting the fine powder of the peels of the citrus fruits into water and decocting it under boiling to obtain a dye bath; and immersing a fiber in said dye bath to provide a dyed fiber product.

2. A fiber dyeing method including steps of:

pulverizing dried peels of citrus fruits;

obtaining fine powder of peels of the citrus fruits by passing the pulverized peels of the citrus fruits through a sieve of 140 to 50 mesh;

putting the fine powder of the peels of the citrus fruits into water and decocting it under boiling; and immersing a fiber in said water while extracting a dye by said decocting under boiling to provide a dyed fiber product.

3. A dyed fiber product that is provided by:

pulverizing dried peels of citrus fruits;

obtaining fine powder of peels of the citrus fruits by passing the pulverized peels of the citrus fruits through a sieve of 140 to 50 mesh;

putting the fine powder of the peels of the citrus fruits into water and decocting it under boiling to obtain a dye bath; and immersing a fiber in said dye bath.

4. A dyed fiber product that is provided by:

pulverizing dried peels of citrus fruits obtaining fine powder of peels of the citrus fruits by passing the pulverized peels of the citrus fruits through a sieve of 140 to 50 mesh;

putting the fine powder of the peels of the citrus fruits into a water and decocting it under boiling; and immersing a fiber in said water while extracting a dye by said decocting under boiling.

* * * * *